July 12, 1955     T. A. BINFORD     2,713,027
CONTINUOUSLY OPERATING CLARIFIER TANKS FOR SEWAGE
LIQUIDS CONTAINING GRITTY AND NON-GRITTY SOLIDS
Filed Jan. 30, 1953     6 Sheets-Sheet 1

FIG. 1.

INVENTOR
THOMAS A. BINFORD,
BY William J. Fox
ATTORNEY

July 12, 1955 T. A. BINFORD 2,713,027
CONTINUOUSLY OPERATING CLARIFIER TANKS FOR SEWAGE
LIQUIDS CONTAINING GRITTY AND NON-GRITTY SOLIDS
Filed Jan. 30, 1953 6 Sheets-Sheet 2

INVENTOR.
Thomas A. Binford

BY William J Fox

ATTORNEY

FIG. 2.

INVENTOR
THOMAS A. BINFORD,
BY William Fox
ATTORNEY

INVENTOR
THOMAS A. BINFORD,
BY William Fox
ATTORNEY

Fig. 5.

2,713,027
Patented July 12, 1955

2,713,027

CONTINUOUSLY OPERATING CLARIFIER TANKS FOR SEWAGE LIQUIDS CONTAINING GRITTY AND NON-GRITTY SOLIDS

Thomas A. Binford, Seattle, Wash., assignor to Dorr-Oliver Incorporated, a corporation of Delaware Application January 30, 1953, Serial No. 334,241

4 Claims. (Cl. 210—3)

This invention relates to apparatus for the clarification treatment of solids carrying liquids by sedimentation, where the suspended solids comprises relatively heavy components along with lighter components, and where these respective components are to be settled out from the liquid sequentially in separate zones, so as to allow for their disposal separate from each other.

Separate settling of heavier gritty from lighter non-gritty components is required for example in the case of primary clarification of raw sewage where the organic solids in suspension are to be settled out from the liquid substantially free from heavier solids as represented by the gritty material; thus the clarification operation yields organic sewage sludge substantially grit free and suited for digestion treatment where the presence of the gritty matter is highly undesirable, digestion treatment being applied to render the sludge innocuous and inoffensive.

In view of the presence of the gritty component it is common practice in sewage treatment to provide for the raw sewage to pass at relatively high velocity through a grit settling chamber or degritting chamber, termed simply the grit chamber, where the raw sewage may unload its burden of grit substantially without allowing the organics to settle; the degritted sewage overflowing from the grit chamber then passes into and through a clarifier tank at velocities low enough to allow the organics to settle to the bottom of the tank where they are removed as organic sewage sludge later to be subjected to the digestion treatment which is to render it innocuous and inoffensive.

The clarified sewage liquid overflowing from this clarifier tank still contains finely-divided sewage matter in suspension and this so-called primary clarifier effluent is therefore usually given further conditioning treatment such as by aeration treatment to render the suspended solids more readily settleable and removable by secondary clarification. However, this invention concerns itself with the relationship between degritting and primary clarification of the raw sewage, preceding the just mentioned secondary clarification treatment.

Because of the average proportion of gritty material usually present in the sewage, the grit chamber capacity bears a certain relationship to the capacity of the primary clarifier or clarifiers; such relationship in terms of the respective settling areas being on the order of 1:50, since the grit settling area required is usually on the order of 2% to 3% of the clarifier settling area. Hence, a single grit chamber may serve a plurality of clarifier tanks. However, such a grit chamber represents a considerable capital investment as well as maintenance and service expense, not only because of the concrete tank structure itself but also in view of the grit handling equipment that goes with it in the form of sediment raking mechanism and other grit handling appurtenances whereby the settled grit from all over the tank bottom is conveyed to a zone or point of discharge whence a pump or other elevator means remove the grit to points of further disposal.

Therefore, a problem arises in regard to properly proportioning the degritting capacity relative to the primary clarifier capacity of the plant, especially where future addition to the plant capacity is contemplated. That is to say, if the plant capacity were to be increased as by adding primary clarifier capacity, this may necessitate the provision of added degritting capacity in excess of that which is actually needed in proportion to the clarifier addition, because of the predetermined size of the additional grit chamber unit. Hence, the excess grit chamber capacity must be carried thereafter as a burden with respect to financing, maintaining and servicing. If excess grit chamber capacity has been provided at the start, its burden must be carried irrespective of when or whether the plant expansion materializes. On the other hand where small size plants are concerned the cost of a special grit chamber may prove to be out of proportion especially where only an oversize grit chamber is applicable or feasible. The grit chamber therefore represents an excess burden that must be carried indefinitely in the running of such small size plants.

It is among the objects of this invention to provide simple inexpensive as well as highly compact degritting facilities which are proportionately dimensioned for such small treatment plants; or else to provide such degritting facilities which can be readily and correctly proportioned with respect to any clairifier capacity of the plant irrespective of its total size or with respect to any future addition thereto.

In view of these objects, this invention proposes to embody in or provide for each individual primary clarifier unit "built-in" degritting facilities proportionately dimensioned to take care of the degritting requirements for its own clarifier unit. Such degritting facilities provide within the zone of liquid entry at the top of the tank auxiliary grit intercepting means comprising a grit-collecting trough disposed in the path of the entering liquid and located within the upper strata of the liquid body undergoing sedimentation in the tank, these auxiliary intercepting means thus being spaced directly upwardly from and overhanging a corresponding area of the tank bottom settling area itself. The grit carried by the inflowing liquid is allowed to settle out and to be intercepted within the zone of liquid entry and under influent conditions where the flow velocity is not too great to allow the grit to settle, yet great enough to avoid any substantial sedimentation of the organic matter along with the grit. A grit collecting mechanism actuated by the sludge raking mechanism of the clarifier itself operates in the trough to convey the grit to a point of removal therein, whence it may be withdrawn or pumped to a place of disposal.

More particularly, this invention is embodied in the type clarifier tank that has a rotary sediment raking mechanism where the liquid or raw sewage enters the liquid body in the tank by way of a cylindrical feedwell or stilling baffle concentric with the tank; the heavier solids in the liquid are thus given by the feedwell a downward trend at the central zone of entry so as to encourage their getting settled upon the tank bottom as near as possible to a centrally disposed discharge sump therein, whereas the liquid carrying lighter solids makes its way from the feedwell radially in all directions towards a peripheral overflow weir and thus into an effluent receiving launder surrounding this weir. In such tanks a rotary raking structure operates to convey the settled solids inwardly towards and into a centrally disposed sludge receiving pocket whence it is withdrawn or pumped to a place of disposal outside of the tank.

According to one embodiment there is provided within the cylindrical feedwell and in concentric relationship therewith a round auxiliary tray presenting auxiliary settling area or surface upon which grit may settle from the inflowing sewage liquid, so that sewage carrying substantially only the lighter degritted organic solids will pass on from the feedwell into the surrounding quiescent body of liquid undergoing sedimentation in the tank. This auxiliary grit intercepting tray is disposed within and with respect to the feedwell in such a manner as to present a grit intercepting surface for the entering liquid within the well, while providing sufficient annular passage area for the degritted sewage to continue past the interceptor tray through the well and into the body of quiescent liquid undergoing sedimentation in the tank. Raking means operate along circular paths upon the tray in a manner to urge settled grit thereon into an annular receiving trough which is formed upon or associated with the tray, whence the collected grit is withdrawn or pumped to a point of disposal. In this way, the grit is intercepted within the central zone of liquid entry itself disposed within the top portion of the tank, where significantly the flow within the feedwell is not too great to allow the gritty component to settle upon the auxiliary settling area in the well, yet great enough to avoid any substantial sedimentation of the organic components along with the grit.

Further particularizing this embodiment, the primary clarifier tank is of the well known center pier type where a hollow pier or column rises from the center of the tank bottom. This pier serves the dual purpose of providing a rising central feed conduit in the tank for the incoming liquid to be discharged from the top end portion of the pier, as well as providing a supporting means for rotatably mounting thereon a raking structure to engage the sediment upon the tank bottom and for conveying such sediment towards and into a sump or discharge zone surrounding the foot end of the pier, incident to the rotation of such a raking structure. A cylindrical feedwell of ample diameter surrounding the top end portion of the pier is mounted upon and supported by the rotary raking structure itself and thus rotates bodily therewith. The embodiment availing itself of this type of clarifier tank provides an annular grit intercepting tray substantially concentric with the axis of rotation of the raking structure and supported within the cylindrical feedwell to rotate bodily therewith. Feed liquid or raw sewage is supplied from a conduit underneath the tank to rise within the center pier and to issue through said openings at the top end portion thereof. In entering the feedwell the liquid deposits its gritty component upon the auxiliary tray structure so that degritted sewage, that is sewage freed of its burden of gritty component although carrying the organic component, may continue downwardly beyond the free edge of the tray structure through and from the feedwell into the surrounding relatively quiescent body of liquid undergoing sedimentation in the tank. The auxiliary tray structure has fixed at its free edge an annular grit collecting trough into which the grit from the tray surface is urged by relatively stationary raking means such as may be suitably supported from a stationary bridge or walkway leading from the top of the pier to the top of the wall of the tank. Grit thus collected is drawn or pumped from the annular collecting trough to a point of disposal outside of the tank.

The degritted sewage passing from the feedwell deposits its heavier solids upon the tank bottom within a zone directly surrounding the foot end portion of the center pier as well as directly subjacent to the auxiliary tray structure above where the grit is being collected. The lighter sewage solids of its organic component are carried farther out into the tank within the liquid body undergoing sedimentation, to settle upon the outer reaches of the tank bottom even as clarified sewage liquid overflows continuously into the effluent launder surrounding the top end portion of the tank.

One feature of this embodiment in the center pier type tank provides that, with the grit collecting trough rotating, a stationary grit engaging member extends into the trough so as to cause thereat an accumulation of grit to form; the suction pipe of a pump may draw upon the accumulation thus being continuously formed, that is to say, the suction pipe of a pump by extending into this accumulation may draw grit for delivery to a point of disposal outside the tank.

According to another embodiment, the grit intercepting and collecting means are provided in the feedwell of a clarifier tank of the type that has an overhead support for the rotary raking structure and herein briefly termed the overhead type. In this case the raking structure is rotatably supported upon and from a stationary bridge or truss construction spanning the entire tank. The central cylindrical feedwell is stationary being supported at and from the underside of the truss construction, and it may have a substantially horizontal supply pipe leading laterally to and into the feedwell. The feedwell has at its bottom an inwardly extending shelf or annular bottom portion from the peripheral inner edge of which extends upwardly an inner cylindrical wall constituting with the feedwell itself and with the annular bottom portion a grit receiving annular trough structure disposed in the path of the inflowing sewage. That is to say, the inner cylindrical wall of the trough terminates upwardly below the top end of the feedwell and also terminates a distance below the liquid level as determined by the peripheral overflow edge of the tank; a supply pipe or conduit feeds raw sewage to and into the trough in such a manner as to allow gritty matter to deposit therein, while sewage carrying non-gritty matter but substantially free of its load of grit passes inwardly across the top of the inner cylindrical wall and then on downwardly and again radially outwardly in all directions from the bottom edge thereof into the surrounding quiescent main body of liquid in the tank.

One or more grit engaging members extend from the central vertical portion of the raking structure into the stationary trough so that the very rotation of the raking structure will have the grit engaging members collect and carry grit upon the trough bottom to a point of withdrawal therein.

According to one feature of this embodiment, the bottom of this stationary trough has a sump or low point for receiving the collected grit, so that the stationary suction pipe of a pump may draw accumulated grit from that low point to deliver to a place of disposal outside the tank.

Other features and advantages will appear as this specification proceeds.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly co-operative equivalents, are therefore intended to be embraced by those claims.

Figure 6ª is a detail section taken on line 6ª—6ª of Figure 6.

Figure 1:
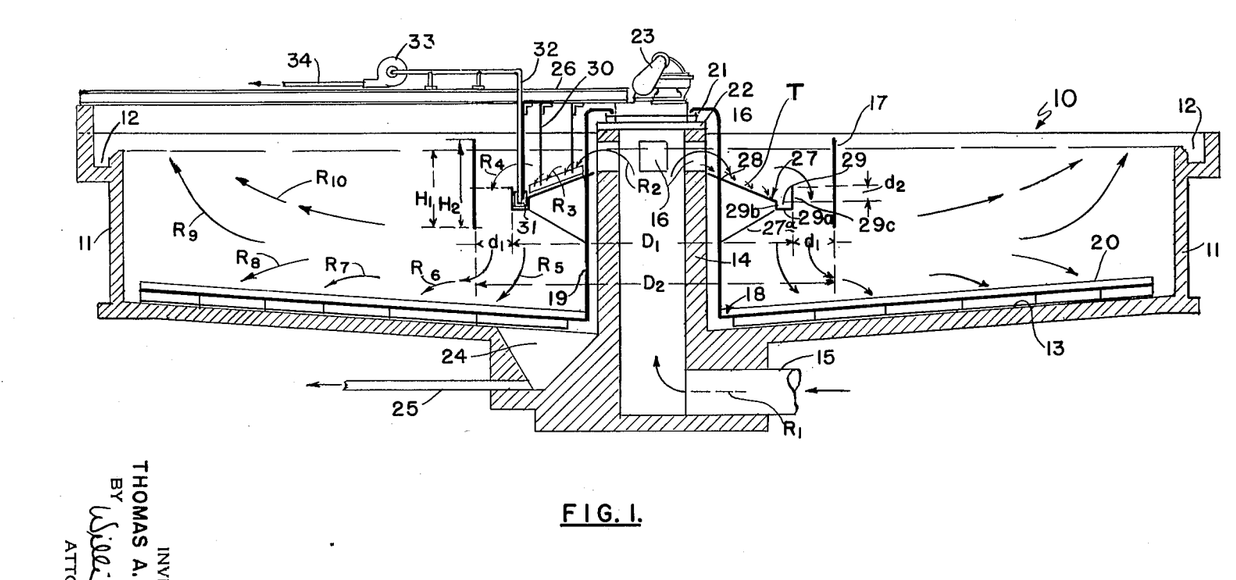
Figure 1 is a diagrammatic elevational sectional view of the clarifier unit of center pier type showing therein one embodiment of the grit intercepting device.

A clarifier unit or settling tank of the center pier type to illustrate one embodiment of this invention, is shown diagrammatically in Fig. 1. This unit comprises a round tank 10 here shown to be of concrete or the like, having a cylindrical wall 11 provided with a peripheral overflow launder 12, and a bottom 13 presenting a shallow inverted conical settling surface. From the center of the tank bottom at the low point thereof rises a hollow center pier 14 into the lower end of which leads a horizontal feed conduit 15, while at its top end the hollow pier 14 has feed emission openings 16 surrounded by a substantially cylindrical feedwell 17. The top end of pier 14 supports a customary rotary raking structure 18 which comprises a vertical cage portion 19 surrounding the pier 14, and horizontally extending sediment raking arms 20 fixed to the bottom end of the cage portion 19. That is to say, the rotary raking structure 18 has an annular bearing 21 at the top end of the pier, the bearing being provided upon and by a base member 22 mounted atop the pier, this base member also having mounted thereon a motorized drive unit 23 for rotating the raking member 18. As the raking structure 18 rotates it conveys settled solids upon the tank bottom from the outer reaches thereof towards the center pier and eventually into a sediment or sludge receiving depression or sump 24. A sludge discharge pipe 25 is indicated to provide for the withdrawal of sludge at a controlled rate from sump 24 to a place of disposal outside the tank.

A stationary bridge or truss 26 provides access from the top of the tank wall to the top of the center pier, the outer end of the bridge being supported upon the tank wall and the inner end upon the base member 22 atop the pier.

A customary structure of the center pier type clarifier tank having thus been outlined by way of example, there will now be described the grit intercepting device which is embodied therein and associated therewith in the manner according to this invention, to operate incident to and concurrently with the rotation of the rotary raking structure 18'.

According to this invention, this grit intercepting device is disposed within the feedwell 17 and comprises an annular grit interceptor tray structure 27 concentrically surrounding the cage portion 19 as well as center pier 14. This tray structure 27 comprising the tray member T proper is mounted upon and rotates together with the cage portion 19, as well as with the feedwell 17, presenting a shallow cone shaped upper face the upper inner edge portion 28 of which is shown to adjoin the lower edge portion of the feed openings 16 to receive discharge therefrom. The outer lower edge portion of the tray member T is formed with an annular trough 29, bracing means for this tray member being indicated at 27ª. The outer diameter of tray structure 27 is designated as $D_1$, the inner diameter of the feedwell 17 designated as $D_2$, so that between the tray structure 27 and the surrounding feedwell 17 there is formed an annular passage area of the width $d_1$.

The annular grit collecting trough 29 comprises a flat bottom portion 29ª, an inner vertical cylindrical wall portion 29ᵇ and outer vertical cylindrical wall portion 29ᶜ, the outer wall portion being higher than the inner wall portion by the differential $d_2$.

Stationary bladed grit engaging means 30 are mounted upon and extend rigidly from the underside of the truss or bridge 26 downwardly into cooperative relationship with the upper face of the tray member 27, whereby gritty matter caught upon and by these tray members T is urged outwardly thereon into the annular grit collecting trough 29. A stationary grit arresting member 31 supported from the stationary truss 26 extends downwardly and into the collecting trough 29, to engage the collected grit therein in such a manner as to provide in the trough a grit accumulation or banking up of collected grit this accumulation to be substantially deep enough for a suction pipe 32 to extend into such accumulation for the purpose of continuously removing grit therefrom. The suction pipe 32 leads from the annular trough 29 to the suction end of a stationary pump 33 shown to be mounted upon the bridge 26, the pump 33 thus to discharge grit drawn from the trough 29 through a discharge pipe 34 to a place of disposal outside of the tank.

Figure 2:
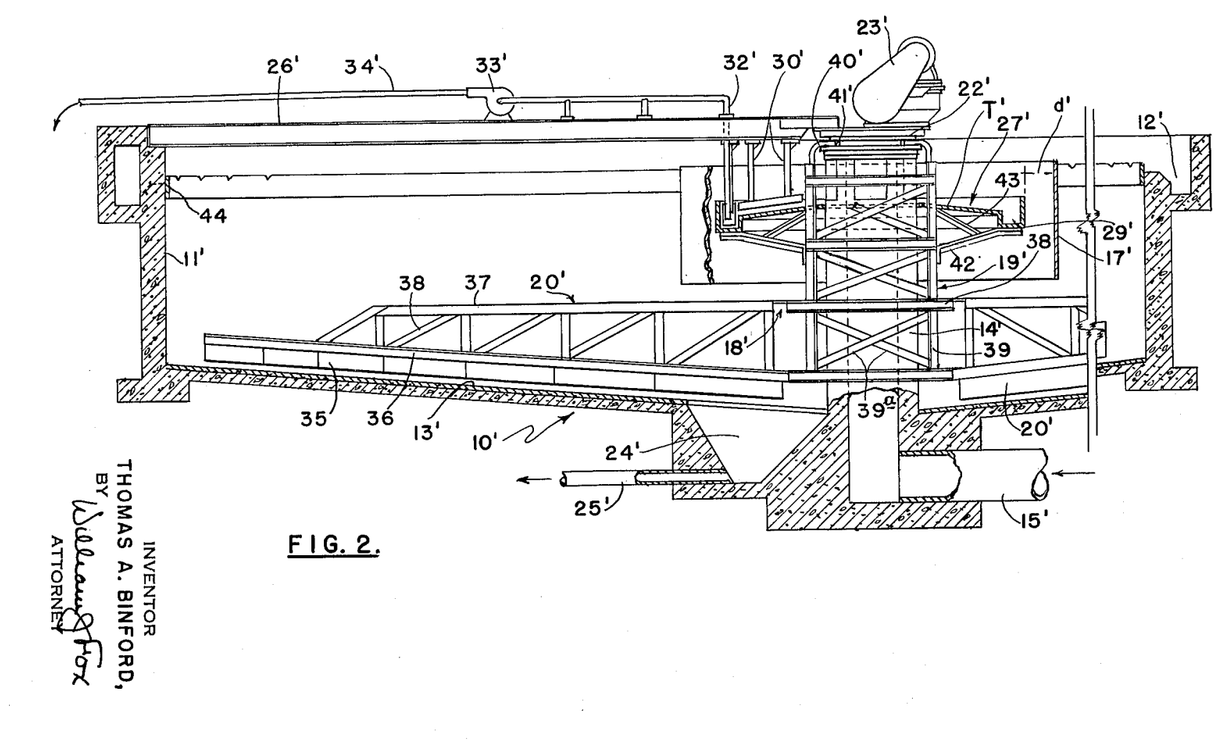
Figure 2 is an enlarged view of the Fig. 1 unit, more fully implemented structurally, and with a tank portion broken away or fore-shortened.

Figure 2 substantiates structurally and in an enlarged scale what is diagrammatically shown in Figure 1 especially insofar as it concerns the structural combination of the sediment raking structure of the clarifier tank with the grit intercepting structure provided according to this invention. The concrete structure of the tank 10 is substantially that shown in Figure 1 including a hollow central pier 14', a tank wall 11', an overflow receiving launder 12', a bottom 13', a feed supply conduit 15', a sediment receiving sump 24', and a sludge withdrawal pipe 25' leaving therefrom. The rotary raking structure corresponding to that shown in Figure 1 is here designated collectively by the numeral 18', and comprises a pair of truss shaped raking arms 20' having sediment engaging blades 35, the truss shape of each arm comprising a lower chord structure 36 and an upper chord structure 37, as well as diagonal bracing members 38 interconnecting the two chord structures 36 and 37. These rake arms 20' are mounted upon and carried by a vertical cage structure 19' surrounding the central pier 14' and comprising vertical structural members 39ª, horizontal structural members 38, as well as diagonal structural member 39. The top end of cage structure 19' has an inwardly overhanging annular portion 40 which comprises a usual ring gear or bull gear 41 rotatably mounted upon a base structure 22'. A motorized drive unit 23' is mounted upon the base structure 22' for geared driving engagement with the ring gear 41 and thus for rotating the sediment raking structure 18'.

A grit interceptor tray structure 27' (corresponding to that which is diagrammatically shown in Figure 1) comprises an annular tray member T' having unitary therewith at its outer periphery an annular grit collecting trough 29', and bracing means in a form of bracing members 42 and 43 securing a tray member 27' upon cage structure 19'. Grit engaging means cooperatively disposed to the annular tray member T' are here shown at 30' to be substantially the same as those shown in Figure 1, and so are the grit withdrawal means comprising a pump 33' mounted upon a stationary truss or bridge 26' supported endwise upon the tank wall and upon the base structure 22' respectively, and further comprising a suction pipe 32' leading from the grit collecting trough 29' to pump 33', and a grit discharge pipe 34' leading from the pump 33' to a place of disposal. The liquid level in the tank is more precisely indicated by a cylindrical weir member 44 provided along the inner side of the overflow receiving launder 12'.

Figure 3:
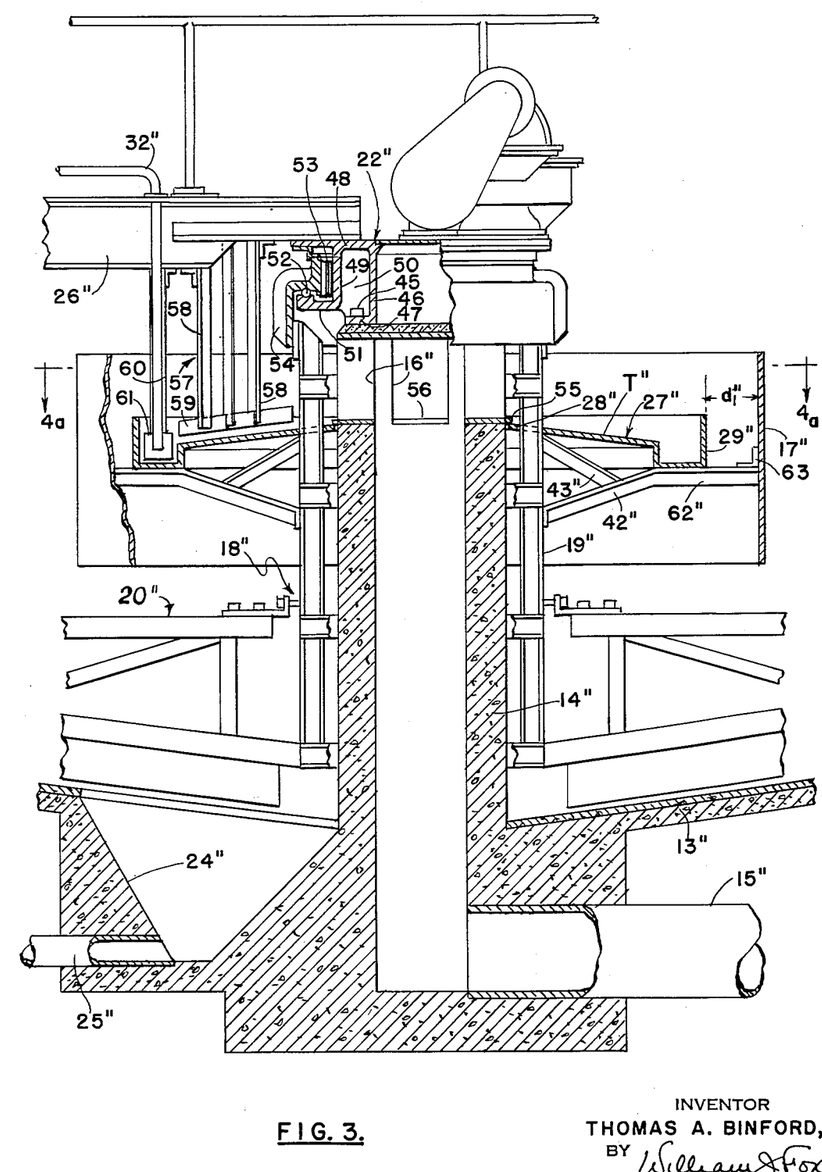
Figure 3 is a further enlarged detail view of the center pier portion of the tank unit of Fig. 2, showing more clearly the grit intercepting device and structure associated therewith.
Figure 4:
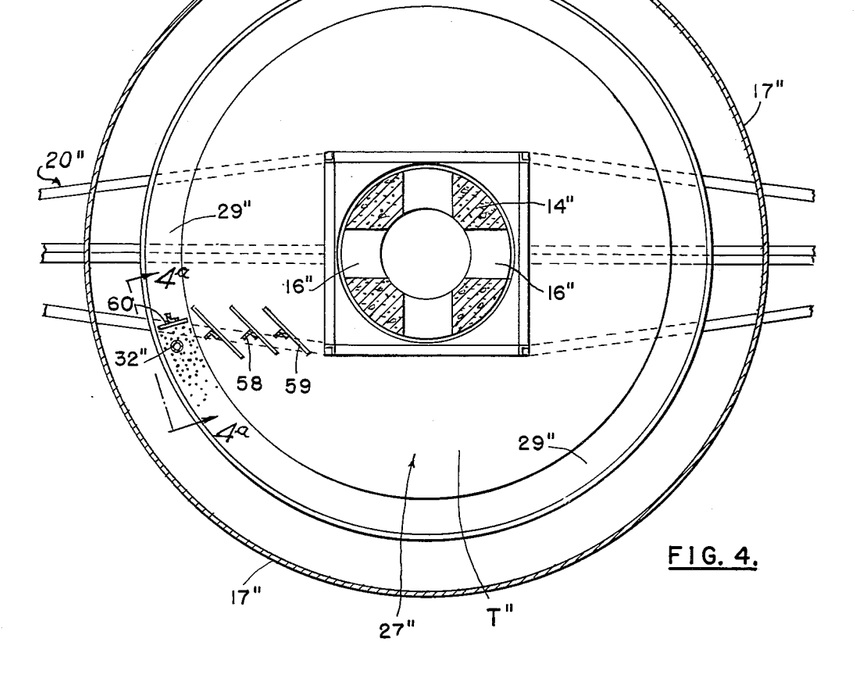
Figure 4 is a cross sectional view taken on line 4—4 of Figure 3 showing more clearly the grit interceptor tray and the disposition of grit collecting and grit removal means therefor.

Referring to the greatly enlarged detailed view of Figures 3 and 4, the tank structure itself is indicated by the hollow center pier 14" and by the portion of the tank bottom 13" directly surrounding and adjacent to the foot end portion of the pier, this adjacent bottom portion including a feed conduit 15", a sediment or sludge collecting sump 24" and a sludge withdrawal pipe 25" leading from the sump. Feed discharge openings 16" are provided at the top end of pier 14". The stationary truss or bridge shown in Figures 1 and 2 to lead from the tank wall to the center pier is here indicated by its inner end portion 26" resting upon and fastened to a cast iron base member 22" mounted atop the center pier and fastened thereto as by anchor bolts 45.

The base structure 22" comprises an inner cylindrical end portion 46 fastened to the top of the center pier by means of an outwardly extending flange portion 47 held by the anchor bolts 45, an intermediate annular body portion 48 extending in a horizontal plane, and an outer cylindrical end portion 49 extending downwardly from the outer periphery of the annular body portion 48 to define therewith and with the inner cylindrical end portion 46 an annular space 50. The outer cylindrical end portion 49 terminates in an annular outwardly extending shelf portion 51 for supporting an annular vertical thrust bearing or ball bearing 52 which carries the rotary raking structure 18" in that the upper end of the cage structure 19" is rotatably supported upon that bearing. That is to say, an internally toothed ring gear 53 is rotatably supported upon the ball bearing 52, the ring gear having bracket portion 54 extending outwardly and downwardly therefrom and being fixedly attached to and thereby constituting a portion of cage structure 19". In this way the ring gear 53 constitutes an inwardly overhanging top end portion of the cage structure overlying the shelf portion 51 of the base member and carried thereon rotatable by the bearing 52.

The grit intercepting device here shown is substantially similar in structure and arrangement to that presented in Fig. 2, in that it comprises a tray structure 27" comprising the annular tray member T" proper which is formed at its outer end with a grit collecting trough 29". Bracing members 42" and 43" serve to secure the tray member T" to the cage structure 19"; the inner edge portion 28" of the tray member is noted to have overlapping relationship with an being overlain by a stationary lip or narrow shelf 55 which constitutes the outer overhanging edge portion of a sill member or plate 56 shown to be provided at the bottom of each respective feed discharge opening 16".

Figure 4A:
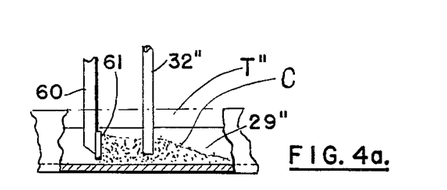
Figure 4a is a part sectional detail view taken on line 4a—4a of Figure 4.

The grit engaging and conveying means are indicated at 57, comprising stems 58 having fixed connection with the truss member 26" and extending downwardly therefrom and carrying at their lower ends blade means 59 in grit engaging relationship with the tray member T". Similarly a stem 60 extends rigidly downwardly from the truss member 26" having at its lower end a grit arresting element 61 in the grit collecting trough 29" and thereby providing an accumulation of grit (see also Fig. 4ᵃ) from which a suction pipe 32" may continuously withdraw grit substantially at the rate at which it accumulates.

The grit intercepting tray structure 27" is surrounded by a cylindrical feed baffle 17" rotating together with the tray structure 27" and thus also with the rotary raking structure 18"; this feedwell 17" is connected with and fastened to both structures 27" and 18" as by outward horizontal extensions or extended terminal portions 62 of the bracing members 42", the connection between these extensions and the feedwell 17" being indicated as by an angle clip 63.

The operation of this unit may be summarized by reference to Figure 1 where raw sewage containing the gritty (inorganic) and the non-gritty (organic) components of the sewage solids enters centrally from below the tank bottom by way of the feed conduit 15 as indicated by arrows $R_1$; this feed influent has a high enough flow velocity to carry the sewage solids gritty as well as non-gritty, non-segregatingly upwardly within pier 14 to the feed openings 16, so that the sewage may pass from the top end of the pier into the annular space surrounding the top end portion of the pier and defined by the diameter $D_2$ and the effective height $H_2$ of the cylindrical feed well 17. From the top end of the pier the entering sewage spreads radially in all directions (see arrows $R_2$) within the feedwell 17 while having its velocity reduced just sufficiently to allow gritty matter to settle upon and be caught by the interceptor tray T as is indicated by arrows $R_3$, while lighter non-gritty matter is carried along further with the flow as indicated by arrows $R_4$, this flow then to be deflected downwardly by the feedwell 17 itself. Thus the sewage substantially freed of the gritty matter caught upon tray T, is given a downward direction when leaving the feedwell by way of the annular passage $d_1$ to pass further radially in all directions into the large body of water in the tank which represents a quiescent settling zone. In this way there is expedited the settling of non-gritty matter (see arrows $R_5$) into that inner initial zone of the tank which surrounds the foot end of the pier and which is substantially directly subjacent to the area defined by feedwell 17. With the further lessening of the radial flow velocity in the outer quiescent zone of the tank, additional quantities of non-gritty matter settle from the sewage liquid onto the outer reaches or zones of the tank bottom (as indicated by arrows $R_6$, $R_7$, $R_8$) while clarified sewage liquid reaches the peripheral overflow discharge launder 12 substantially along flow lines indicated by arrows $R_9$ and $R_{10}$.

Meanwhile, the rotary raking structure 18 being driven by the drive unit 23 from the top end of the pier conveys settled matter from all over the tank bottom inwardly towards the center pier and eventually into the sludge sump 24 for withdrawal therefrom through sludge discharge pipe 25. As the raking structure 18 rotates the gritty matter upon the interceptor tray T is urged or conveyed outwardly by the stationary bladed grit engaging means 30 and thus into the annular collecting trough 29. The stationary grit arresting or obstructing member 31 extending into trough 29 from above provides therein a local accumulation C of grit (see Fig. 4ᵃ) from which the pump 33 may draw a mixture of grit and liquid by way of the suction pipe 31 and for disposal through the discharge pipe 34.

Figure 5:
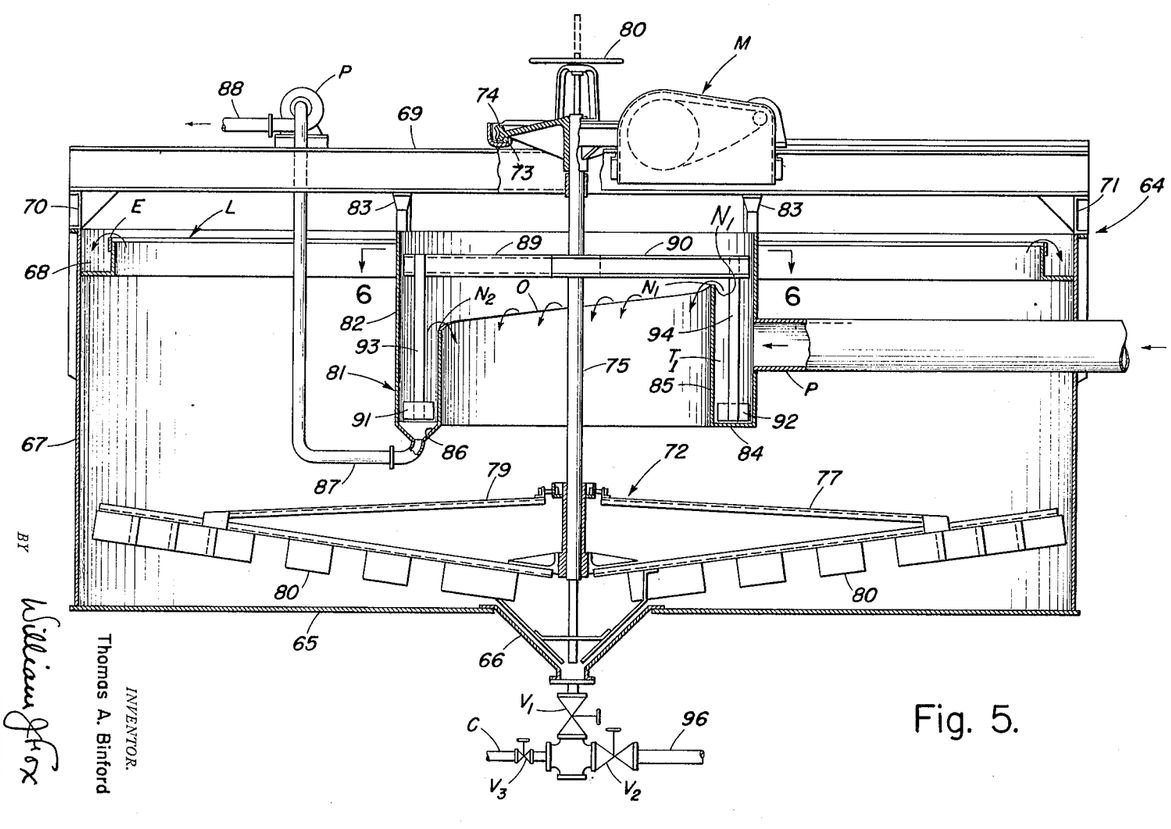
Figure 5 is a vertical section of an embodiment in a clarifier unit which has the raking mechanism operatively supported from an overhead structure at the top of the tank.
Figure 6:
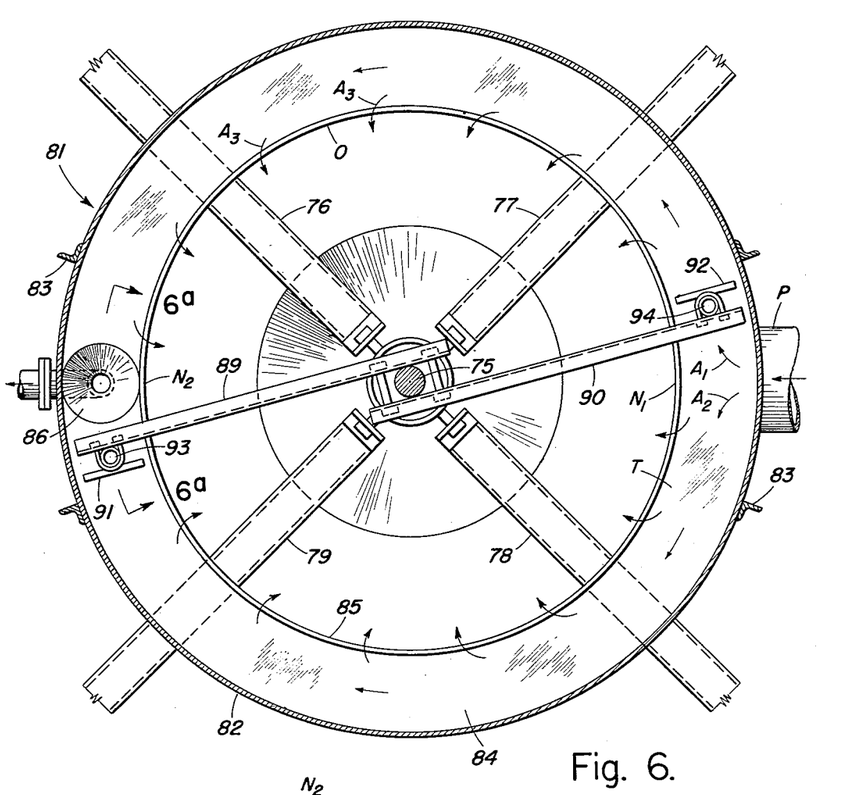
Figure 6 is a transverse detail section along the line 6—6 of Figure 5.
Figure 6A:
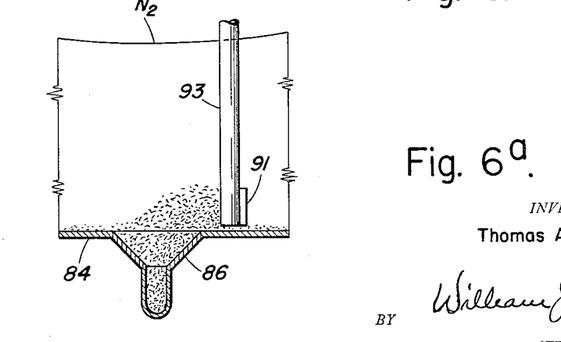

The embodiment in Figures 5, 6, 6ᵃ shows the type of tank in which the raking structure is rotatably supported upon a stationary overhead structure or bridge construction extending across the top of the tank and supported thereby, instead of being supported by a central pier. Such a tank 64 comprises a bottom 65 having a central sludge collecting and discharge cone 66, and a cylindrical wall 67 rising from the bottom and provided at the top thereof with an annular overflow launder 68. A stationary overhead beam construction or bridge structure 69 is mounted upon and supported by the top of the tank as is indicated by supporting brackets 70 and 71, for rotatably supporting a rotary raking structure 72. That is to say, an annular thrust bearing 73 is mounted upon the bridge structure 69 and rotatably supporting thereon a worm gear 74 which has driving relationship with a vertical shaft 75 extending downwardly therefrom. The lower end of the shaft 75 carries rake arms 76, 77, 78, 79 each provided with raking blades 80 for engaging sediment or sludge to convey it towards and into the discharge cone 66. A drive mechanism or drive unit M is shown to be mounted upon the bridge structure 69 for rotating the worm gear 74 and thereby the raking structure 72. Well known lifting mechanism for deliberately raising the raking structure 72 from or out of the sludge bed is indicated by a handwheel 80. Rotation of the handwheel will raise or lower the raking structure because of splined driving connection between the vertical shaft 75 and the worm gear 74.

In this embodiment of the invention a combined feedwell and grit interceptor structure 81 is supported dependently from the stationary bridge structure 69 and it surrounds and is substantially concentric with the vertical shaft 75. That is to say, the feedwell comprises an outer cylindrical wall portion 82 supported from the bridge structure 69 as by brackets 83 and extending upwardly a distance above the level L of the liquid in the tank as defined by the overflow edge E of launder 68. An annular horizontal bottom portion 84 extending inwardly from the bottom end of the cylindrical feedwell portion 82, and an inner cylindrical wall portion 85 rises from the inner edge of the bottom portion 84 to extend upwardly a distance terminating below the liquid level L. In this way there is formed by the cylindrical wall portions 82 and 85 and the annular bottom portion 84 an annular grit interceptor trough T into which leads a horizontal feed pipe P entering the tank through the wall 67 thereof and below the overflow launder 68. The annular bottom 84 of trough T has a sump 86 from which in turn leads a discharge pipe 87 to the suction side of a pump P shown to be mounted upon a bridge structure 69 and having a discharge connection 88 for carrying a mixture of intercepted grit and liquid to a point of disposal outside the tank.

The vertical rotary shaft 75 has fixed thereto at an intermediate point a pair of arms 89 and 90 each of which in turn carries a grit engaging and conveying element or plate 91 and 92 respectively, which plates are mounted to the outer ends of respective arms 89 and 90 as by vertical stems 93 and 94 respectively.

Feed liquid carrying a mixture of gritty and non-gritty solids passes through the horizontal feed pipe P into and through the grit interceptor trough $T_1$, to pass across the top edge of cylindrical wall portion 85 and then downwardly and finally radially into the quiescent zone surrounding the feedwell structure 81. The top edge O of the inner cylindrical wall portion 85 of the grit interceptor trough is slightly sloped downwardly and away from the side of the infeed pipe P in such a manner as to induce the incoming liquid to distribute itself substantially uniformly along the top edge O. That is to say as the feed liquid enters the trough $T_1$, it meets the highest point of the top edge O and therefore splits distributively in opposite directions into the trough $T_1$ as indicated by arrows $A_1$ and $A_2$. As each portion of the liquid flows along each respective half of the trough $T_1$ it distributes itself along the overflow edge O substantially uniformly from the highest point $N_1$ to the lowest point $N_2$ thereof, such distribution being indicated by a series of small arrows $A_3$. While thus flowing through the trough $T_1$ the liquid deposits therein the gritty material while non-gritty material is carried along with the liquid across the overflow edge O and then downwardly within the cylindrical wall 85 into the body of quiescent liquid in the tank. Thus, non-gritty material settles upon the tank bottom to be engaged by the raking blades 80 as the rotary mechanism 72 rotates, to be conveyed to the discharge cone 66 for discharge through a discharge pipe 96, the rate of discharge being controllable as is indicated by valves $V_1$ and $V_2$. An auxiliary water connection C having a control valve $V_3$ is shown for relieving any congestion that might occur in or around the discharge control valves $V_1$ and $V_2$. Meanwhile, clarified liquid overflows into the launder 68 and from there discharges to a point of disposal (not shown) while the grit engaging blades 91 and 92 carry gritty material settled upon the bottom 84 of annular trough $T_1$ to a sump 36 whence the pump P draws a mixture of grit and liquid for discharge to a point of disposal outside the tank.

I claim:

1. In combination with a clarifier tank for clarifying solids-carrying liquids by sedimentation in which the solids comprise a heavy gritty component and a lighter non-gritty component, said tank having centrally disposed feed supply means comprising a feed well, a peripheral overflow launder, sediment discharge means at the bottom, as well as a rotary raking structure comprising a central vertical member surroundeded by said feed well, sediment-engaging rake arms extending from the lower end portion of said vertical member, stationary supporting structure for rotatably supporting said vertical member, and power drive means for rotating said member; grit-interceptor means disposed within said feed well above the tank bottom, comprising an annular grit interceptor structure supported within and disposed substantially concentric with said feed well and in the path of the solids carrying liquid passing through said feed well and having a circular grit collecting trough, grit engaging devices effective by the rotation of the raking structure to convey said grit to a point of withdrawal in said collecting trough, and means for withdrawing collected grit from said trough to a point of disposal outside the tank.

2. The combination according to claim 1, in which said supporting structure comprises a hollow central pier for conducting incoming liquid upwardly therethrough and from the top end thereof radially into the feed well surrounding it; in which said vertical member comprises a cage construction surrounding said pier and having its upper end portion rotatably supported upon said pier; in which said grit interceptor means comprise an annular tray structure connected with said collecting trough and supported therewith upon and rotatable together with said cage construction so that grit settling on said tray structure will be delivered into said collecting trough; in which said grit engaging devices comprise stationary grit engaging means deriving support from said pier; and in which said grit withdrawing means comprise a stationary conduit extending into said trough.

3. The combination according to claim 2, in which said grit engaging device provides a local accumulation of grit in said trough, and in which said grit withdrawing means comprise a stationary pipe so disposed as to extend downwardly into said accumulation.

4. The combination according to claim 1 in which the supporting structure comprises an overhead bridge construction spanning the tank, providing operating support for the rotary raking structure; in which the feed supply means comprise a feed pipe leading substantially horizontally and laterally into the feedwell and so as to have intersecting relationship therewith; in which said grit-interceptor means comprise an annular trough provided by said feed well constituting the outer wall of the trough, an annular bottom extending from the lower end portion of the feed well inwardly, and an inner cylindrical wall extending upwardly from the inner peripheral edge portion of said bottom and terminating a distance below the upper edge of said feedwell as well as the distance below the liquid level as defined by the overflow launder of the tank; in which the grit engaging means comprise a rotary grit engaging element extending from said vertical member of the raking structure into said trough; and in which the grit withdrawing means comprise a stationary conduit connected with and leading from the annular bottom of the trough.

References Cited in the file of this patent

UNITED STATES PATENTS

| | | |
|---|---|---|
| 1,957,168 | Hyde | May 1, 1934 |
| 2,062,988 | Callow | Dec. 1, 1936 |
| 2,268,475 | Darby | Dec. 30, 1941 |
| 2,291,772 | Talbot et al. | Aug. 4, 1942 |
| 2,378,756 | Durdin 3d | June 19, 1945 |
| 2,483,706 | Lind | Oct. 4, 1949 |
| 2,525,842 | Thompson et al. | Oct. 17, 1950 |
| 2,589,298 | Scott | Mar. 18, 1952 |

FOREIGN PATENTS

| | | |
|---|---|---|
| 875,164 | France | June 8, 1942 |